United States Patent
Isaji et al.

(10) Patent No.: US 7,205,888 B2
(45) Date of Patent: Apr. 17, 2007

(54) DRIVING ASSISTING APPARATUS FOR PREVENTING VEHICULAR COLLISION

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 141 days.

(21) Appl. No.: 10/988,494

(22) Filed: Nov. 16, 2004

(65) Prior Publication Data

US 2005/0123173 A1 Jun. 9, 2005

(30) Foreign Application Priority Data

Dec. 9, 2003 (JP) ............... 2003-410906

(51) Int. Cl.
*G08B 19/00* (2006.01)
(52) U.S. Cl. .............. 340/522; 340/435; 340/903; 701/48; 701/70; 342/71
(58) Field of Classification Search ........... 340/435, 340/522, 901, 903, 907; 348/148; 701/48, 701/53, 70, 93, 1; 342/71; 180/271
See application file for complete search history.

(56) References Cited

U.S. PATENT DOCUMENTS 5,204,536 A  4/1993  Vardi

| | | | |
|---|---|---|---|
| 6,037,860 A * | 3/2000 | Zander et al. | 340/436 |
| 6,724,300 B2 * | 4/2004 | Miyakoshi et al. | 340/435 |
| 6,727,807 B2 * | 4/2004 | Trajkovic et al. | 340/436 |
| 2003/0043030 A1 * | 3/2003 | Kudo | 340/435 |

FOREIGN PATENT DOCUMENTS

| | | |
|---|---|---|
| DE | 197 34 005 A1 | 2/1999 |
| EP | 1 024 050 A1 | 8/2000 |
| FR | 2 248 515 | 5/1975 |
| FR | 2 742 284 | 6/1997 |
| GB | 2 394 076 A | 4/2004 |
| GB | 2394076 B * | 7/2005 |
| JP | A-2001-101592 | 4/2001 |

OTHER PUBLICATIONS

Search report from French Patent Office in corresponding French patent application dated Jul. 7, 2005.

* cited by examiner

*Primary Examiner*—Jeffery Hofsass
*Assistant Examiner*—Hongmin Fan
(74) *Attorney, Agent, or Firm*—Posz Law Group, PLC

(57) ABSTRACT

A driving assisting apparatus for preventing a vehicular collision including a camera, a target detector and a processor. The camera takes an image of a predetermined range in front of a vehicle. The target detector detects in the image a target notifying to stop the vehicle to prevent a vehicular collision. In a case that the target detector detects a plurality of the targets, the processor automatically stops the vehicle at a safe position required to prevent the vehicle from colliding with another vehicle.

16 Claims, 3 Drawing Sheets

DRIVING ASSISTING APPARATUS FOR PREVENTING VEHICULAR COLLISION

CROSS REFERENCE TO RELATED APPLICATIONS

This application is based upon and claims the benefit of priority of Japanese Patent Application No. 2003-410906 filed on Dec. 9, 2003, the contents of which are incorporated herein by reference.

FIELD OF THE INVENTION

The present invention relates to a driving assisting apparatus for preventing a vehicular collision.

BACKGROUND OF THE INVENTION

JP2001-101592A discloses a driving assisting apparatus for preventing a vehicle from colliding with another vehicle at an intersection, etc. At an intersection, the driving assisting apparatus located on a vehicle captures image information from the intersection to both the left and the right roads far-off from the intersection, by using two wide-angle cameras at both sides of a front bumper of the vehicle.

Both of the wide-angle cameras transmit image information to an image processor repeatedly. The image processor detects moving objects such as other vehicles or motorcycles in the image information. The driving assisting apparatus controls the vehicle not to collide with the moving objects based on data of detected moving objects, a velocity and a steering angle of the vehicle. To be more specific, when the driving assisting apparatus determines a collision is imminent between the vehicle and the other moving object, the driving assisting apparatus executes a braking operation automatically and restricts an accelerating operation by the driver. Further, the driving assisting apparatus alarms against the driver.

However, when the driving assisting apparatus erroneously detects moving objects in the image information, the unit executes a braking operation and unnecessarily restricts an accelerating operation. In this case, the vehicular movement does not follow the intention of the driver. This case should be surely avoided.

SUMMARY OF THE INVENTION

The present invention has an object to provide a driving assisting apparatus capable of reliably detecting the occasion for the vehicle to stop and supporting the driving operation to stop the vehicle.

A driving assisting apparatus for preventing a vehicle collision according to the present invention comprises a camera, a target detector and a driving assisting processor.

The camera takes an image of a predetermined range in front of the vehicle. The target detector detects a target, which will require that the vehicle should stop, in the image. The driving assisting processor stops the vehicle by a stop position to prevent a collision of the vehicle in a case that the target detector detects multiple targets.

BRIEF DESCRIPTION OF THE DRAWINGS

Other features and advantages of the present invention will be appreciated, as well as methods of operation and the function of the related parts, from a study of the following detailed description, appended claims, and drawings, all of which form a part of this application. In the drawings:

DETAILED DESCRIPTION OF THE PREFERRED EMBODIMENTS

Figure 1:
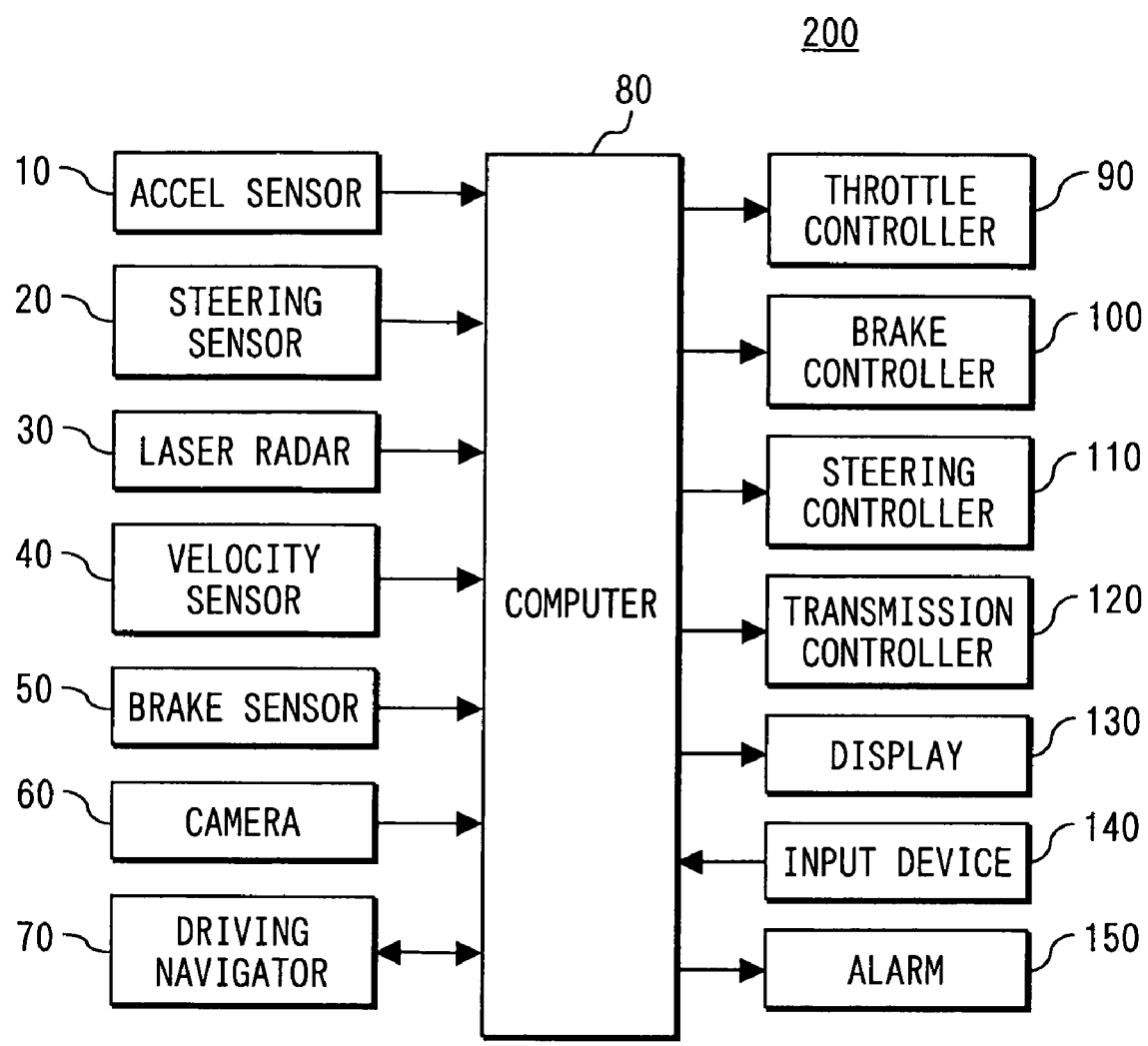
FIG. 1 is a block diagram illustrating a driving assisting apparatus according to an embodiment of the present invention.

Referring to FIG. 1, a driving assisting apparatus 200 includes an accelerator sensor 10, a steering sensor 20, a laser radar 30, a vehicle velocity sensor 40, a brake sensor 50, a camera 60 with an imaging device such as CCD (Charge-Coupled Device) and CMOS (Complementary Metal Oxide Semiconductor), a driving navigator 70, a throttle controller 90, a brake controller 100, a steering controller 110, a transmission controller 120, a display 130, an input device 140, and an alarm 150.

The driving assisting apparatus 200 further includes a computer 80 in data communication with each of the above components. The computer 80 includes input/output interfaces and an assortment of electrical control circuits as is commonly known.

In general, the computer 80 is adapted to execute a driving assisting process to decelerate and stop the vehicle by a stop position to prevent the vehicle from colliding with another vehicle located ahead of the vehicle. The computer 80 executes this process based on the information received from each of the sensors. The computer 80 detects a plurality of targets notifying to stop the vehicle in an image information in front of the vehicle captured and transmitted by the camera 60.

The driving assisting process by the computer 80 further includes a lane keeping assist function, a cruise control function including keeping a velocity of the vehicle and a safe distance to a front vehicle. Based on information from respective sensors, the computer 80 drives the throttle controller 90, the brake controller 100, the steering controller 110 and the transmission controller 120 execute these functions.

As stated above, the computer 80 executes the driving assisting process based on the information received from the sensors.

The accelerator sensor 10 detects the position of a throttle between an open position and a closed position. The accelerator sensor 10 then sends a signal representing the detected throttle position to the computer 80. The steering sensor 20 detects a change in steering angle of the vehicle and calculates a relative steering angle based on the detected change. The steering sensor 20 sends a signal representing this relative steering angle to the computer 80.

The laser radar 30 uses both an emitter and a sensor to detect a distance to, a relative velocity to, and an orientation of a front object such as a front vehicle. The emitter emits an optical signal such as a laser light wave. The optical signal then reflects off of the front object and is received by the sensor. The laser radar transforms this received optical signal into an electrical signal and sends it to the computer 80. It should be appreciated that in an alternative embodiment, other waves such as electromagnetic millimeter waves, electromagnetic microwaves and ultrasonic waves, may also be used.

The vehicle velocity sensor 40 detects the travel velocity of the vehicle by detecting a rotational frequency of at least one wheel on the vehicle. The brake sensor 50 detects whether a brake pedal in the vehicle is in a depressed state and sends a signal to the computer 80 identifying such.

The camera 60 is mounted on a rear of a rearview mirror for example, and is adapted to take images in front of the vehicle and transmit image information to the computer 80. More specifically, the camera 60 transforms each image to an electrical signal and sends that signal to the computer 80. Based on this signal, the computer 80 determines whether the vehicle should decelerate and stop or not.

The driving navigator 70, as commonly known, comprises a mapping function to identify the position of the vehicle and show the position in a map, a facility search function to query the information of facilities around the vehicle, a routing function to search and guide routes to a selected destination, etc.

The driving navigator 70 includes a position detector, a mapping data input device, a VICS (Vehicle Information Communication System) receiver, etc. The position detector includes a GPS (Global Positioning System) receiver to detect the position of the vehicle using detection means such as geomagnetism, a gyroscope, a rangefinder, or radio waves sent from satellites. The position detector is composed of the above detection means to complement their errors each other. The position detector may not use all of the detection means if the positioning accuracy is ensured.

The mapping data input device is used for inputting a map data recorded on a recording device such as CD-ROM, DVD-ROM, memory or hard disk drive which are selected corresponding to the amount of the mapping data.

The mapping data include node data and link data. Each road in the mapping data is composed of the node data representing intersections or junctions and the link data connecting the node data.

Each of the link data includes ID number, length, latitude and longitude coordinates of a start end and a terminal end of the link, name of the road, width, etc. Each of the node data includes ID number, latitude and longitude coordinates of the node, name of the node, ID numbers of the links connected to the node, classification of the node, installation information of traffic signals and other traffic signs.

The VICS receiver retrieves road traffic information sent by beacons installed on roads and/or by broadcast stations. The road traffic information includes congesting zones and the degrees of congestions.

The computer 80 directs the driving navigator 70 to calculate a distance from a current position of the vehicle to a position of a stop line in front of an intersection, a crosswalk, etc., having traffic lights and/or stop signs. This distance is referred to as a stop distance. The driving navigator 70 transmits the stop distance to the computer 80.

The computer 80 controls the throttle controller 90, brake controller 100, steering controller 110, and transmission controller 120 according to the signals received from the acceleration sensor 10, brake sensor 50 and steering sensor 20. The throttle controller 90 adjusts the position of the throttle between open and closed and, therefore, the power generated by a power source such as an internal combustion engine. The brake controller 100 adjusts a braking pressure applied to braking system of the vehicle. The steering controller 110 adjusts the steering angle of the vehicle. The transmission controller 120 selects a gear position of a transmission, thereby controlling the vehicle velocity.

In an exemplary embodiment, the display 130 includes a liquid crystal display disposed in a central console of a passenger compartment of the vehicle. The display 130 may be enabled to display information sent by the computer 80 and intended to notify the driver to decelerate the vehicle.

The input device 140 is envisioned to include a touch screen provided in the display 130. Alternatively, the input device 140 may include a plurality of mechanical switches. In an exemplary embodiment, the alarm 150 includes an audible alarm having a magnitude according to a signal sent by the computer 80. Alternatively, the alarm 150 may include a visual alarm having a magnitude according to a signal sent by the computer 80 or any other foreseeable device capable of serving the principles of the present invention.

The computer 80 detects the collision imminence with a front vehicle as described above. If it is determined the driver should decelerate the vehicle, the computer 80 sends signals for generating alarms for driver from the display 130 and/or the alarm 150.

The computer 80 executes an image recognition process such as a matching for predetermined patterns on the image information produced by the camera 60, and detects therein a target notifying the vehicle to stop. The target is such as an illuminated brake light of front vehicles, a stop signal of traffic lights or a traffic sign notifying the traffic to stop.

In the case that only one target is detected in the image information and the target has been detected incorrectly, the driving assisting apparatus 200 acts unnecessarily on that occasion. Thus, the driving assisting apparatus 200 in an exemplary embodiment determines the vehicle should stop only in the case that a plurality of targets is detected in the image information. Hence, the driving assisting apparatus 200 is prevented from decelerating and braking the vehicle contrary to the intention of the driver when stopping is unnecessary, even when the computer 80 detects a target incorrectly.

Figure 2:
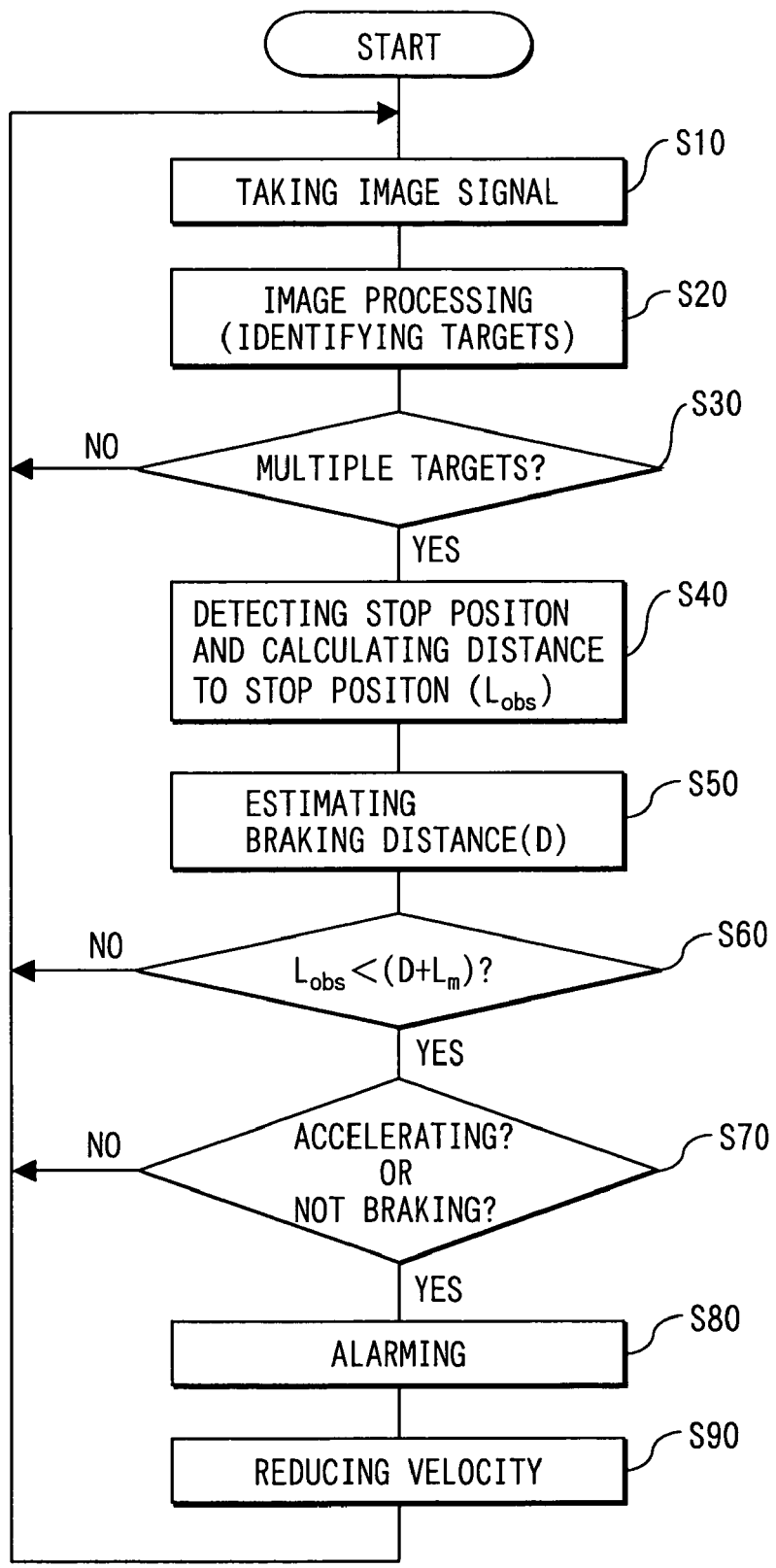
FIG. 2 is a flowchart showing a driving assisting process to stop a vehicle undertaken by the driving assisting apparatus of the embodiment.

A driving assisting process conducted by the driving assisting apparatus 200, particularly the computer 80, is now described with reference to the flowchart shown in FIG. 2.

In step S10, the computer 80 takes in images in front of the vehicle taken by the camera 60. In step S20, the computer 80 executes an image recognition process of matching for templates of predetermined targets on the image information.

In step S30, the computer 80 determines whether more than two targets of the same kind are detected or not in step S20, such as stop lights of more than two vehicles, stop signals of more than two traffic lights or more than two traffic signs.

Figure 3:
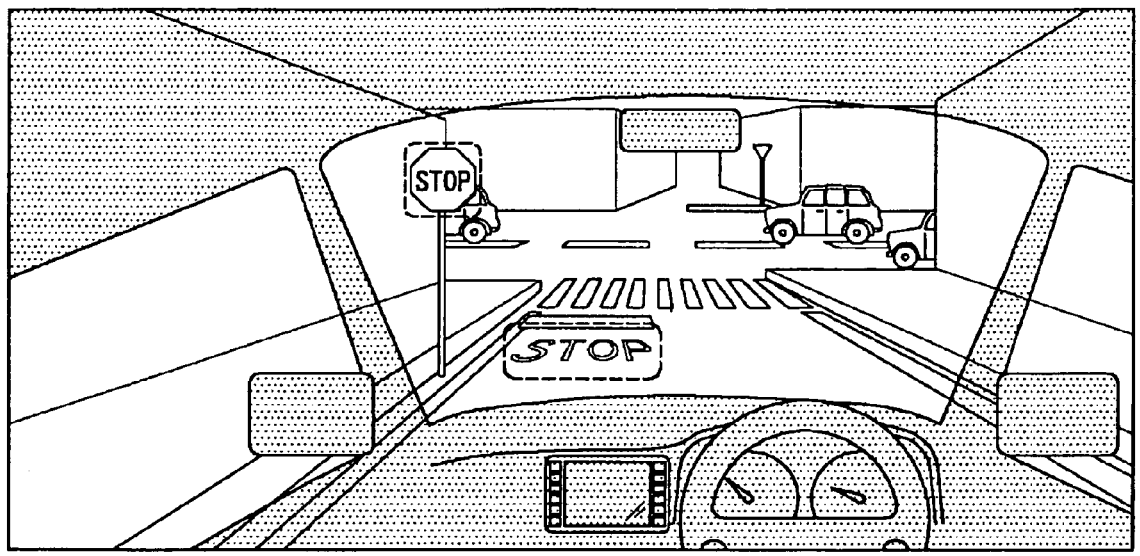
FIG. 3 is a perspective view illustrating an example of a plurality of targets notifying to stop a vehicle.

The computer 80 does not determine as more than two targets are detected in the case that the targets detected in step S20 belong to different kinds from each other or from one another, for example, a stop light of the front vehicle and a stop signal of a traffic signal. As shown in FIG. 3, the computer 80 determines stop signs posted at a road shoulder and painted on the road as more than two targets.

If No in step S30, that is, if only one target or no target is detected, the process goes back to step S10. If Yes in step S30, the process proceeds to step S40.

In step S40, the computer 80 identifies a position where the vehicle should stop, hereinafter referred to as a stop position, and calculates a distance from the vehicle to the stop position.

In the case that stop lights of more than two front vehicles are detected, the computer 80 calculates a stop distance from the current position of the vehicle to a closest front vehicle in the same lane and a relative velocity of the vehicle and the closest front vehicle. The computer 80 calculates the velocity of the closest front vehicle based on the relative velocity and the velocity of the vehicle. Then the computer 80 calculates the deceleration of the closest front vehicle by repeated calculation of the velocity thereof. The computer estimates the stop position and the braking distance $L_{st}$ of the front vehicle based on the deceleration thereof.

The stop position by which the vehicle should stop is calculated based on the braking distance $L_{st}$. The computer 80 calculates the distance $L_{obs}$ from the vehicle to the stop position, within which the vehicle should stop, as a summation of the braking distance $L_{st}$ and the current distance $L_{ct}$ from the vehicle to the closest front vehicle.

In the case that the computer 80 detects a plurality of stop signals or a plurality of stop signs, the computer 80 sets the stop position to a stop line in front of an intersection or a crosswalk corresponding to the traffic lights or the traffic signs. The driving navigator 70 has positions of the stop line in a map data, and the computer 80 directs the driving navigator 70 to calculate the distance from the vehicle to the stop line. The computer 80 receives a distance $L_{obs}$ from the current position of the vehicle to the stop position, hereinafter referred to as a required distance, from the driving navigator 70. The computer 80 can set the stop position also by recognizing the painting of the stop line on the road in the image.

In step S50, the computer 80 estimates a braking distance D by a normal braking operation of the vehicle using the velocity detected by the vehicle velocity sensor 40. In step S60, the computer 80 determines whether the distance $L_{obs}$ is larger than the summation of the braking distance D and a predetermined marginal distance $L_m$.

Figure 4:
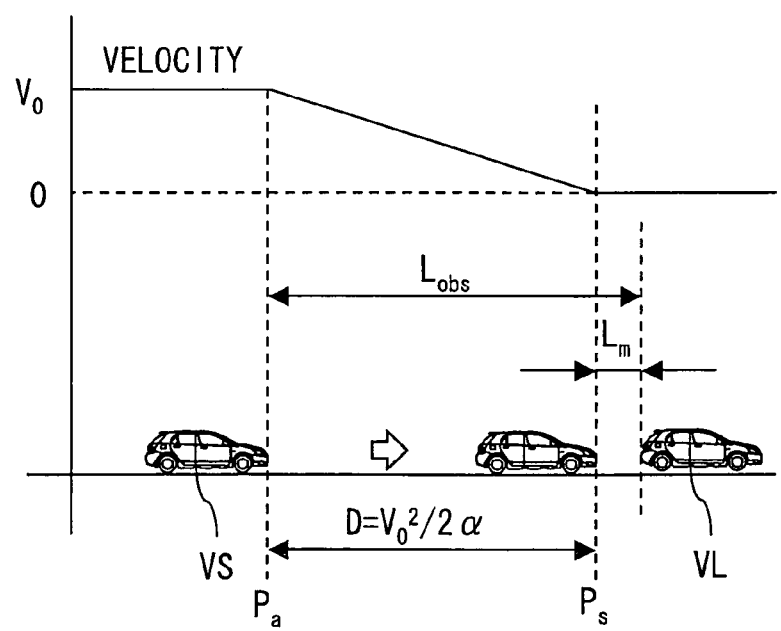
FIG. 4 is a schematic view illustrating an estimated braking distance when a driver takes a braking operation.

As shown in FIG. 4, in the case that stop lights of a plurality of front vehicles are detected as the target, the computer 80 determines whether the required distance $L_{obs}$ to the estimated stop position of the closest front vehicle VL is larger than the summation (D+$L_m$) of the estimated braking distance D and the marginal distance $L_m$.

The computer 80 calculates the braking distance D from where the driver starts a braking operation to where the vehicle stops by the following equation (1).

$$D = V_0^2 / (2 \times \alpha) \qquad (1)$$

wherein $\alpha$ denotes a deceleration by normal braking operation by the driver, which is set between 0.49 and 2.94 m/s² for example.

The marginal distance $L_m$ is set to several meters for example.

If No in step S60, that is, when the driver can afford the time to stop the vehicle in the required distance $L_{obs}$, the process returns to step S10 and the steps described above are repeated. If Yes in step S60, that is, when the driver should have started braking immediately to stop the vehicle within the required distance $L_{obs}$, the process proceeds to step S70.

In step S70, it is determined whether the driver is executing any one of accelerating operation and releasing operation of the brake, that is, whether the driver has no intention to decelerate the vehicle. As shown in FIG. 4, when a front vehicle VL is decelerating in front of the vehicle VS, the driver of the vehicle VS estimates the stop position of the front vehicle VL by recognizing the deceleration thereof. The driver stops accelerating and/or starts braking by a position Pa which is considered to be critical for the driver to stop the vehicle safely by the estimated stop position of the front vehicle VL.

If No in step S70, the process returns to step S10 and the steps described above are repeated. If Yes in step S70, the driver is determined to be unaware of the decelerating front vehicle VL, and the process proceeds to step S80.

In step S80, the display 130 and/or the alarming device 150 generate(s) an alarm. The alarm notifies the driver to decelerate the vehicle VS promptly. In step S90, the computer 80 automatically decelerates the vehicle VS by controlling the brake controller 100. The step S90 may include controlling the throttle controller 90 and/or the transmission controller 120 to generate engine braking. Further, the step S90 may include controlling the steering controller 110 to steer the vehicle when required to evade collision to the front vehicle VL.

In the case that a plurality of stop signals and/or a plurality of stop signs are detected in step S30, the steps S60 to S90 are executed generally in the same manner as described above. That is, in the case that the driver executes no decelerating operation at a position where is critical to stop the vehicle safely by the stop line corresponding to the stop signals and/or the stop signs, the driver is determined to be unaware of the stop signals and/or the stop signs. In this case, the computer 80 decelerates the vehicle automatically.

By the driving assisting process described above, the computer 80 correctly detects occasions where the vehicle should be decelerated. If the driver is unaware of the occasions, the driving assisting process decelerates and stops the vehicle.

The embodiment described above may be modified in accordance with the principles of the present invention.

For example, the driving assisting apparatus 200 may determine whether the driver is executing a decelerating operation or not based on comparing the deceleration of the vehicle with a predetermined criterial value. The deceleration of the vehicle may be detected by an acceleration sensor instead of calculating the change of the velocity.

The velocity and the deceleration of the front vehicle may be detected by calculating the change of front vehicle position in the image information produced by the camera instead of using a laser radar. The stop position of the front vehicle is estimated based on the velocity and the deceleration above. Accordingly, the laser radar is not always necessary in estimating the stop position of the front vehicle and in calculating the required distance $L_{obs}$.

The stop position corresponding to the stop signals and/or the stop signs may be detected by identifying the positions thereof by executing image recognition process for the image information instead of using the laser radar.

What is claimed is:

1. A driving assisting apparatus for preventing a vehicular collision comprising:
   a camera which takes an image of a predetermined range in front of a vehicle;
   a target detector which detects in the image targets existing in front of the vehicle notifying to stop the vehicle; and
   a processor which assists driving of the vehicle to stop the vehicle at a safe position, wherein
   the processor stops the vehicle only in a case that the number of the targets detected by the target detector is plural, and the processor stops the vehicle only when the plural targets are the same kind of stop notification.

2. The driving assisting apparatus according to claim 1, wherein:

the target is a stop light of a front vehicle; and the processor estimates a front vehicle stop position of the front vehicle located ahead of and closest to the vehicle and sets the safe position in front of the front vehicle stop position.

3. The driving assisting apparatus according to claim 1, wherein:

the target is a stop signal of a traffic light; and the processor detects a stop position corresponding to the traffic light and sets the safe position to the stop position.

4. The driving assisting apparatus according to claim 1, wherein:

the target is a traffic sign notifying traffic to stop; and the processor detects a stop position corresponding to the traffic sign and sets the safe position to the stop position.

5. The driving assisting apparatus according to claim 1, further comprising:

a driving operation detector which detects at least one of an accelerating operation and a braking operation; and a braking controller which reduces a velocity of the vehicle, the braking controller braking the vehicle when the processor determines that no vehicle stopping operation is taken, wherein the processor determines whether the stopping operation is taken to stop the vehicle at the safe position based on a detection result of the driving operation detector.

6. The driving assisting apparatus according to claim 5, wherein:

the processor calculates a stop distance from a current position of the vehicle to the safe position, and determines that no stopping operation is taken in the case that the driving operation detector detects the accelerating operation or no braking operation when the stop distance is smaller than a predetermined distance.

7. The driving assisting apparatus according to claim 1, further comprising:

a deceleration detector which detects a deceleration of the vehicle; and a braking controller which reduces a velocity of the vehicle when the processor determines that no stopping operation is taken, wherein the processor comprises:

a stop distance calculator which calculates a stop distance from a current position of the vehicle to the safe position; and a stop operation determiner which determines whether the stopping operation is taken to stop the vehicle at the safe position based on the deceleration of the vehicle and the stop distance.

8. A driving assisting method comprising steps of:

opto-electrically taking an image of a predetermined range in front of a vehicle;

electrically distinguishing in the image targets notifying to stop the vehicle; and automatically assisting driving of the vehicle to stop at a safe position only in a case that a plurality of the targets is distinguished in the distinguishing step, wherein the assisting is performed only when the targets are the same kind of stop notification.

9. The driving assisting method according to claim 8, wherein the assisting step further comprising steps of:

detecting decelerating operation including at least one of a braking operation, an accelerator-releasing operation and a deceleration of the vehicle;

determining whether it is possible to stop the vehicle by the decelerating operation; and decelerating the vehicle to stop at the safe position in a case that it is determined to be impossible to stop the vehicle in the determining step.

10. The driving assisting method according to claim 8, wherein the assisting step further comprising steps of:

detecting a deceleration of the vehicle;

calculating a distance from the vehicle to the safe position;

determining whether it is possible to stop the vehicle within the distance at the deceleration; and decelerating the vehicle to stop at the safe position in a case that it is determined to be impossible to stop the vehicle in the determining step.

11. The driving assisting apparatus according to claim 1, wherein the kind of stop notification is a brake light.

12. The driving assisting apparatus according to claim 1, wherein the kind of stop notification is a stop sign.

13. The driving assisting apparatus according to claim 1, wherein the kind of stop notification is a stop signal of a traffic light.

14. The driving assisting apparatus according to claim 8, wherein the kind of stop notification is a brake light.

15. The driving assisting apparatus according to claim 8, wherein the kind of stop notification is a stop sign.

16. The driving assisting apparatus according to claim 8, wherein the kind of stop notification is a stop signal of a traffic light.

* * * * *